United States Patent [19]

Compton

[11] Patent Number: 4,910,875

[45] Date of Patent: Mar. 27, 1990

[54] LONGITUDE LOCATION DEVICE

[76] Inventor: Robert Compton, 8300 Woodcreek Dr., Waco, Tex. 76712

[21] Appl. No.: 210,092

[22] Filed: Jun. 22, 1988

[51] Int. Cl.⁴ .............................................. G01C 21/04
[52] U.S. Cl. ....................................... 33/268; 33/228; 33/277
[58] Field of Search ................. 33/227, 228, 268, 269, 33/270, 271, 282, 286, 276, 277; 356/247, 248, 253, 255; 350/600

[56] References Cited

U.S. PATENT DOCUMENTS

| 2,871,754 | 2/1959 | Marble | 350/600 |
| 2,918,725 | 12/1959 | Ellsworth | 33/269 |
| 4,060,908 | 12/1977 | Skallerup | 33/277 X |

FOREIGN PATENT DOCUMENTS

| 11797 | of 1897 | United Kingdom | 33/268 |
| 2076150 | 11/1981 | United Kingdom | 33/278 |

Primary Examiner—Harry N. Haroian
Attorney, Agent, or Firm—Johnson & Gibbs

[57] ABSTRACT

A longitude finder for locating the longitude on the earth of a defined location at which the user of the device is positioned. The device includes a reflective surface for viewing an image of one body in the solar system, such as the moon or a planet, while directly observing another body such as the north star. One specific form of the device is a mirror having side panels secured perpendicular to the mirror in parallel spaced relation to permit the user to directly view the north star above an image in the mirror of the moon or a defined planet. The other form of the device includes a sphere such as made of glass with side panels and handles for supporting this sphere whereby the first body in the solar system such as the north star is observed directly and a first reflection of the moon or a planet is seen in the outer surface of the sphere and a second reflection from the inner surface of the sphere while directly observing the north star in vertical alignment with the reflections. The exact Greenwich mean time is determined at the location of the user and a nautical almanac is consulted to establish the exact longitude of the user based upon whether the moon or a defined planet is used.

14 Claims, 2 Drawing Sheets

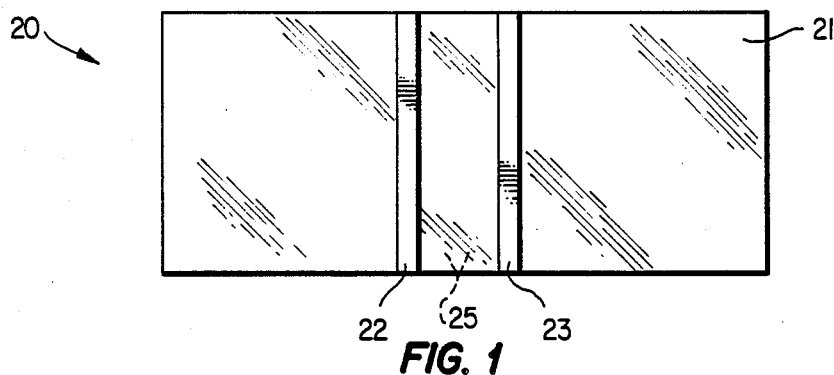
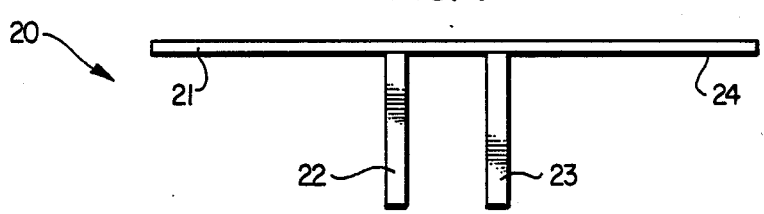
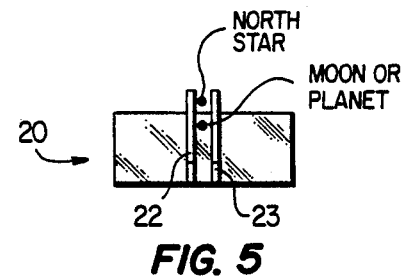
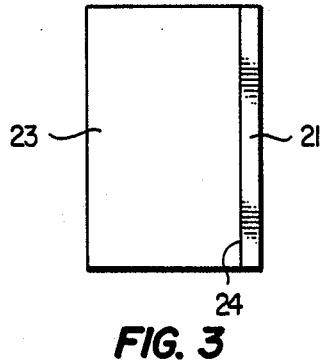
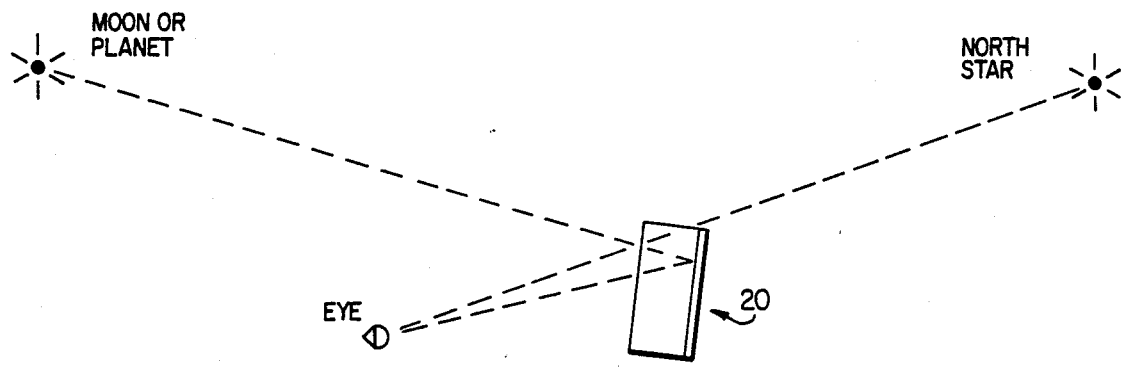

LONGITUDE LOCATION DEVICE

BACKGROUND OF THE INVENTION

Field of the Invention

This invention relates to celestial navigation devices and more particularly relates to devices for lOcating the longitude on the earth of the user.

In the past, it has been customary to use a sextant to make the necessary readings for determining the longitude of a preselected location. There are, however, inherent disadvantages to the use of a sextant. Preferably, it is used with an ocean horizon, and thus, is much more difficult to use in locations where a horizon is not visible to the observer, and where trees and structures, such as houses and buildings obstruct the necessary view. Thus, using available devices and known methods presents difficulty in determining longitude, particularly at a location in the presence of obstacles which impair the view of the observer, and under some weather conditions such as when the horizon is obscured by clouds and the like.

It is a principal object of the invention to provide a new and improved device for determining the longitude of a particular location.

It is another object of the invention to provide a longitude finding device which does not require observation of an ocean horizon.

It is another object of the invention to provide a longitude finder which may be used where buildings, trees, and the like partially obscure the vision of the user.

It is another object of the invention to provide a longitude locating device which is usable so long as solar system bodies such on the north star and the moon or another identifiable planet due south of the observer are visible.

It is another object of the invention to provide apparatus and method for determining the longitude of a selected location comprising means and a method for simultaneously observing a first body such as the north star and a second body such as the moon or a planet due south of the observer, recording GMT (Greenwich mean time), and finding the GHA (Greenwich hour angle) for the second planet, the GHA being the same as the longitude of the observer.

It is another object of the invention to provide a longitude locating device employing a mirror and sight means for simultaneously observing a first body such as the north star and a selected planet due south of the observer.

It is another object of the invention to provide a longitude finder which includes reflective means and direct sight means for simultaneous viewing of the north star and a selected planet or the moon due south of the observer.

It is another object of the invention to provide a longitude finder which includes sight means for viewing the north star including and circular reflective glass means providing a double reflective image of the moon or planet due south of the observer.

In accordance with the invention, there is provided a longitude finder having means for directly sighting a first solar system body such as the north star, means for sighting a reflection of a second solar system body, such as the moon or a selected planet, south of the user, and means for aligning the image of the second body in a vertical line with the first body establishing the longitude of the second body. One form of the device includes a mirror with sight panels to line up the image with the directly sighted first body. Another form of the invention includes a reflective sphere providing a double image of the second body. The method of the invention includes sighting a first solar system body, sighting a reflected image of a second body due south of the first body, lining up the two images on a vertical line, determining the Greenwich mean time of the sighting, and determining the longitude of the second body at such Greenwich mean time.

The above objects and advantages of preferred embodiments of the invention will be better understood from the following detailed description thereof in conjunction with the accompanying drawing wherein:

BRIEF DESCRIPTION OF THE DRAWING

FIG. 1 is a front view in elevation of a longitude finder in accordance with one embodiment of the invention;

FIG. 2 is a top view of the longitude finder of FIG. 1;

FIG. 3 is a right end view of the longitude finder of FIGS. 1 and 2;

FIG. 4 is a schematic view showing the longitude finder of FIGS. 1–3 in side elevation when establishing a longitude by the user;

FIG. 5 is a front view in elevation of the longitude finder, as for illustrated in FIG. 4 showing the relative positions of the north star and the observed planet;

DETAILED DESCRIPTION OF THE PREFERRED EMBODIMENT

Figure 6:
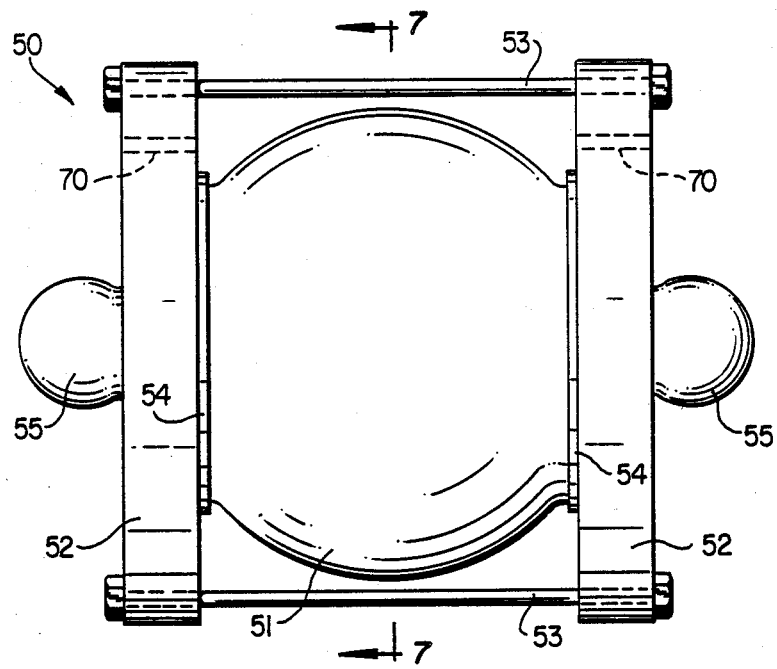
FIG. 6 is a side view in elevation of another form of longitude finder embodying the feature of the invention.

Referring to FIGS. 1–3, a longitude finder 20 embodying the features of the invention includes a mirror 21 and a pair of spaced parallel sight panels 22 and 23. Preferably, the mirror and sight panel are each rectangular in shape. The sight panels are secured in perpendicular relation to the front reflective surface 24 of the mirror in parallel relationship spaced apart on opposite sides of the longitudinal center line of the mirror. While, for purposes of illustration, the sight panels 22 and 23 are sown a substantial distance apart, they may be placed much closer together so long as adequate mirror surface is visible between the panels to permit the viewing of the reflection of a planet or the moon in the mirror between the panels by the user. Also, if desired, a sight member 25, as illustrated in broken lines in FIG. 1, may be attached on the top of the mirror along the center line between the panels for more ready alignment of the device with the north star during use.

While the device may be made any size convenient for use, one model found very easy to use had a mirror approximately 14 inches by 8 inches by 1¼ inch thick and panels approximately 4 inches by 8 inches by 1½ inch thick.

The longitude finder 20 is used as illustrated schematically in FIG. 4. The device is used at night when the north star is visible and when the moon or a selected planet is at a location substantially due south of the user. The user faces the north star and holds the device with both hands at opposite ends of the mirror 21 and the mirror aligned at an upward angle, as illustrated, sufficiently that the moon or the selected planet can be seen in the mirror at the same time that the north star is observed over the top edge of the mirror. The simultaneous observation of the north star and the moon or planet is continued until the reflection of the moon or planet in the mirror is midway between the sight panels 22 and 23 can be vertically aligned with the north star which is seen above the top edge of the mirror, also at the midpoint between the panels. It will be apparent that the mirror should be held substantially horizontal so that the sight panels 22 and 23 will be substantially vertical, and thus, the moon or planet image and the north star can be aligned along the vertical line midWay between the sight panels. Holding the mirror at the indicated angle locates the upper outer corers of the sight panels nearest the user slightly above the line of sight from the eye of the user to the north star as indicated in FIG. 4. The device preferably is held at substantially arms length to provide maximum accuracy in the alignment of the north star, and the moon or planet image. At the time the moon or planet image appears at the midpoint between the panels blow the north star, the moon or planet is due south of the user. At this time the exact Greenwich mean time (GMT) is recorded and a nautical almanac is consulted for the longitude of the moon or the selected planet at this particular observed time. That longitude will be the longitude of the user at the location where the user is standing with the longitude locator device 20. It will be apparent that if a substantially horizontal horizon is available it will assist in aligning the mirror, though the mirror can be lined up with a great deal of accuracy without the horizon. Holding the mirror at near arms length and sighting the north star between the sight panels causes the user to keep the mirror at right angles to the line of sight to the north star. The use of the moon or a planet is preferred as they are easily identified and, additionally, it is not necessary when using them to work out the sidereal hour angle. It has been found through repeated use of the longitude finder that the longitude can be located within one degree of accuracy.

Figure 7:
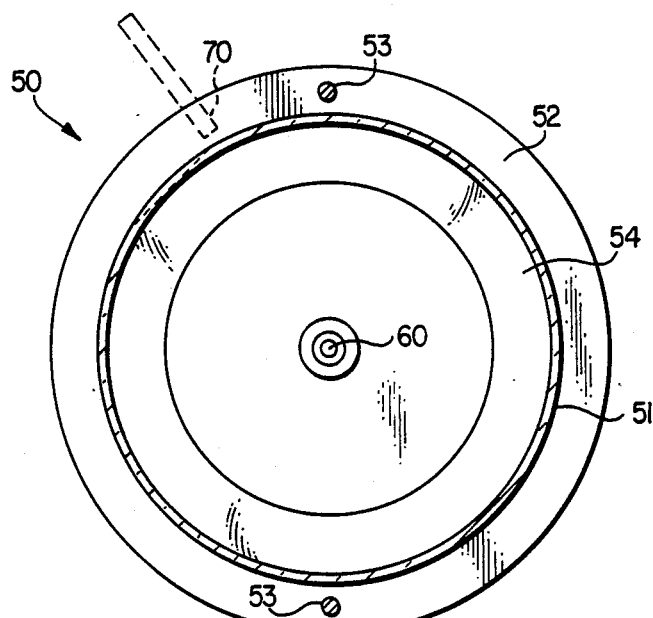
FIG. 7 is a view in section along the line 7—7 of FIG. 6 illustrating in phantom lines a mirror which may also be used with the embodiment of FIGS. 5 and 6.
Figure 8:
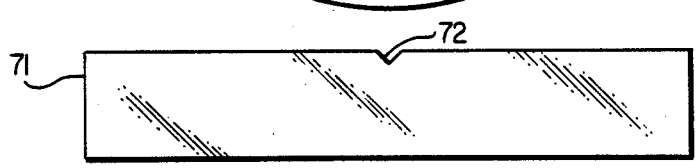
FIG. 8 is a front view in elevation of the mirror which may be used with the device of FIG. 5 and 6.

Referring to FIGS. 6 and 7, a longitude finder 50 embodying the features of the invention includes a reflective hollow glass body 51 mounted between identical end plates 52 held together by nut and bolt assemblies 53. Mounting pates 54 are positioned at each end of the body 51 between the body and the adjacent end plate 52. A handle 55 is secured to the center of the outer face of each of the end plates 52 held by a bolt and nut assembly 60 secured from the inner face of each plate 54 through the adjacent end plate 52 into the handle. The glass body 51 is essentially a major central section of a sphere having open opposite ends which terminate in slightly an outwardly turned lip or flange at the juncture with each mounting plate 54. The glass 51 is a section of a transparent sphere having reflective surfaces on both the outside surface of the body and the inside surface. To the observer-user of the device the outside surface facing the user becomes a first reflective surface, while the inside surface on the side of the sphere away from the user becomes a second reflective surface visible to the user. Such surfaces are evident in FIG. 9. The plates 52, the plates 5,, and the handles 55 may be made of plastic, wood, or any other suitable, preferably light weight, material.

If desired the mirror feature of the longitude finder 20 may be combined with the longitude finder 50 by providing a radial slot 70 in each of the end plates 52, opening outwardly as best seen in FIG. 7. A rectangular mirror 71 having a central V-shaped sight 72 in the upper edge thereof is positioned in the slots 70. The mirror 71 in the device 50 provides in a single device combining the functions of both of the longitude finders disclosed.

Figure 9:
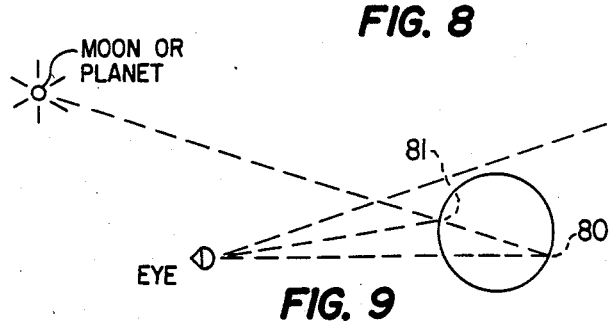
FIG. 9 is a schematic side view illustrating the use of the device of FIGS. 5 and 6.
Figure 10:
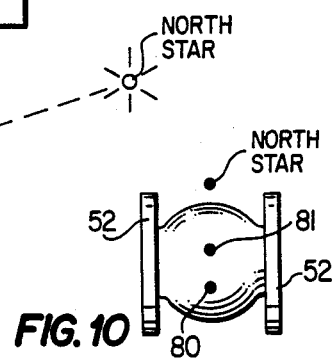
FIG. 10 is a schematic front view as seen by the user illustrating the use of the device as shown in FIG. 8.

FIGS. 9 and 10 illustrate the use of the longitude finder 50 to locate the longitude on which the user is standing. The device is held essentially at arms length by the handles 55 holding the handles as nearly as possible along a horizontal line with the user facing the north star and the moon or selected planet due south or directly behind the user. With the north star sighted directly above the middle of the lass body 51, the reflection of the moon or selected planet is viewed i the glass body as represented in FIG. 9. Two reflections of the moon or planet will be visible to the user. A first reflection 80 is seen on the back inside surface of the glass body 51 away from the user, while a second identical image of the moon or planet is observed on the outer surface of the glass body 51 nearest the user and above the inner reflection 80. When the moon or planet is positioned exactly south of the user, the north star and both of the images of the moon or planet will be aligned along a vertical axis as seen in FIG. 10. When this double reflection of the moon or planet can be lined up with the north star, the meridian transit or passage of the moon or planet is occurring and the user is on the same longitude line as the body being observed. This longitude line is determined by obtaining the exact Greenwich mean time and again noting the longitude of the body in the nautical almanac.

If desired, the mirror 71 may be inserted in the slots 70 and the device 50 used in the same manner as the device 20, previously described.

While the devices 20 and 50 have been described primarily in terms of locating the longitude of the user, the device may be also used to set a watch or clock to Greenwich mean time (GMT). The following the previously described procedures, the elapsed time between the meridian passage of several planets and/or the moon are noted. The corresponding times are located in a nautical almanac and the total elapsed time is added to the Greenwich mean time of the first body observed, which will provide the watch or clock setting at true Greenwich mean time.

What is claimed is:

1. A longitude finder comprising:
   first means comprising a pair of spaced parallel sight panels for directly sighting a first solar body along a vertical reference line; and
   second means comprising a mirror secured with said sight panels providing a reflective surface to provide an image of a second solar body and align said image with said first solar body along said vertical reference line.

2. A longitude finder in accordance with claim including reference line sight means on the said mirror between said sight of panels.

3. A longitude finder comprising;

a first means comprising a pair spaced parallel sight panels for directly sighting a first solar body along a vertical reference line; and second means comprising a section of a transparent sphere between said sight panels providing a first reflection of said first body in the front side of said sphere toward said user and a second reflection of said first body in an inside surface of a backside of said sphere away from said user to provide an image of a second solar body and align said image with said first solar body along said vertical reference line.

4. A longitude finder in accordance with claim 3 where said sight panels comprise parallel side panels spaced on opposite sides of said sphere and means securing said panels together with said sphere clamped between said panels.

5. A longitude finder in accordance with claim 4 including outside handles on said side panels for holding said finder.

6. A longitude finder in accordance with claim 5 where said side of panels have radial slots in a common plane for a mirror positioned in a plane parallel to the axis of said sphere for observing a reflection of said second body, said mirror having sight means for observing said first body to line up said first body with said reflection of said second body.

7. A longitude finder in accordance with claim 4 where said side panels are secured together by nut-bolt assemblies on opposite sides of said sphere.

8. A longitude finder in accordance with claim 7 where said sphere has opposite open ends at which said side panels are secured to a said sphere.

9. A longitude finder in accordance with claim 1 where said first means is a rectangular mirror and said sight panels are secured to the reflective surface of said mirror perpendicular to the plane of said mirror in parallel spaced relation to provide a guide for aligning said first body with said reflection of said second body.

10. A longitude finder in accordance with claim 9 including a sight on the upper edge of said mirror along a line midway between said side panels.

11. A method of establishing the longitude of a selected location comprising:
sighting a first solar system body from said location;
observing a reflection of a second solar system body due south of said first body;
aligning the image of said second body on a vertical axis passing through the direct image of said first body;
determining the Greenwich mean time of the observation of said bodies when said bodies are aligned along said vertical reference axis; and
determining the longitude of said second body at said Greenwich mean time.

12. A method in accordance with claim 11 wherein said first body is the north star and said second body is the moon or a selected solar system planet.

13. A method in accordance with claim 12 wherein said image of said second body is observed in a mirror.

14. A method in accordance with claim 12 wherein said image of said second body is observed in a reflective body comprising a section of a sphere.

* * * * *